US008902765B1

(12) United States Patent
Wang et al.

(10) Patent No.: US 8,902,765 B1
(45) Date of Patent: Dec. 2, 2014

(54) METHOD AND APPARATUS FOR CONGESTION AND FAULT MANAGEMENT WITH TIME-TO-LIVE

(75) Inventors: Chi-Lie Wang, Milpitas, CA (US); Jason Z Mo, Fremont, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 1103 days.

(21) Appl. No.: 12/712,560

(22) Filed: Feb. 25, 2010

(51) Int. Cl.
*G01R 31/08* (2006.01)
*H04L 12/841* (2013.01)

(52) U.S. Cl.
CPC ................... *H04L 47/286* (2013.01)
USPC ........................................ 370/252

(58) Field of Classification Search
CPC ..................................... H04L 47/286
USPC ................. 370/252, 229, 230, 235, 237, 392, 370/395.4, 474; 455/423, 452.2, 453; 715/741; 726/2
See application file for complete search history.

(56) References Cited

U.S. PATENT DOCUMENTS

| | | | | |
|---|---|---|---|---|
| 4,305,097 A * | 12/1981 | Doemens et al. | ............. | 348/126 |
| 5,461,614 A * | 10/1995 | Lindholm | ..................... | 370/394 |
| 6,621,796 B1 * | 9/2003 | Miklos | ........................... | 370/236 |
| 7,483,943 B2 * | 1/2009 | Kakivaya et al. | ............. | 709/203 |
| 7,760,737 B2 * | 7/2010 | Rana et al. | ..................... | 370/394 |
| 7,974,278 B1 * | 7/2011 | MacAdam et al. | ........... | 370/389 |
| 2003/0016686 A1 * | 1/2003 | Wynne et al. | ................. | 370/412 |
| 2003/0103459 A1 * | 6/2003 | Connors et al. | ............... | 370/235 |
| 2004/0081184 A1 * | 4/2004 | Magill et al. | .................. | 370/413 |
| 2006/0092867 A1 * | 5/2006 | Muller et al. | ................. | 370/312 |
| 2008/0144523 A1 * | 6/2008 | Nishi et al. | ..................... | 370/253 |
| 2009/0316698 A1 * | 12/2009 | Menten | ......................... | 370/392 |
| 2010/0242113 A1 * | 9/2010 | Jayawardena et al. | .......... | 726/23 |

* cited by examiner

*Primary Examiner* — Ricky Ngo
*Assistant Examiner* — Phuongchau Ba Nguyen
(74) *Attorney, Agent, or Firm* — Heimlich Law

(57) ABSTRACT

A method and apparatus for congestion and fault management with time-to-live (TTL) have been disclosed. Each time a packet is transferred into an Egress Port's Final Buffer, an associated TTL Timeout Counter will be loaded with a value. If the packet cannot be transferred out of the Egress Port before TTL timeout, it will be purged by removing a memory buffer pointer from the corresponding Virtual Output Queue (VOQ) entry.

1 Claim, 8 Drawing Sheets

METHOD AND APPARATUS FOR CONGESTION AND FAULT MANAGEMENT WITH TIME-TO-LIVE

RELATED APPLICATION

This application is related to application Ser. No. (not yet issued) filed this same date by the same inventors titled "Method and Apparatus for Selective Packet Discard", which is hereby incorporated herein by reference in its entirety including all incorporated references therein. This application is related to application Ser. No. (not yet issued) filed this same date by the same inventors titled "Method and Apparatus for Dynamic Traffic Management with Packet Classification", which is hereby incorporated herein by reference in its entirety including all incorporated references therein.

FIELD OF THE INVENTION

The present invention pertains to switches. More particularly, the present invention relates to a method and apparatus for congestion and fault management with time-to-live.

BACKGROUND OF THE INVENTION

Switches are widely used in systems. For example, the Serial Rapid Input Output (sRIO) Gen2 Switch may be used to meet wireless infrastructure customer's requirements for WCDMA/LTE Base Stations.

Some of these requirements are challenging, for example, an 18-port Serial Rapid IO (sRIO) Gen2 Switch may be required to achieve very high performance (up to 360 Gbit) with minimum packet latency (<30 ns excluding sRIO protocol stack delay) to meet wireless infrastructure customer's requirements for WCDMA/LTE Base Stations.

A switch needs to be able to deal with packets and meet bandwidth and latency requirements. Traffic congestion can affect bandwidth and latency. For instance, if a fatal error occurs at an Egress Port or a remote connected device encounters some faulty condition, traffic could be blocked from the Egress port and back pressure can be applied all the way back to Ingress port. As a result, traffic to all other non-faulty ports could be blocked thereby resulting in serious performance degradation. This presents a problem.

BRIEF DESCRIPTION OF THE DRAWINGS

The invention is illustrated by way of example and not limitation in the figures of the accompanying drawings in which.

DETAILED DESCRIPTION

Figure 1:
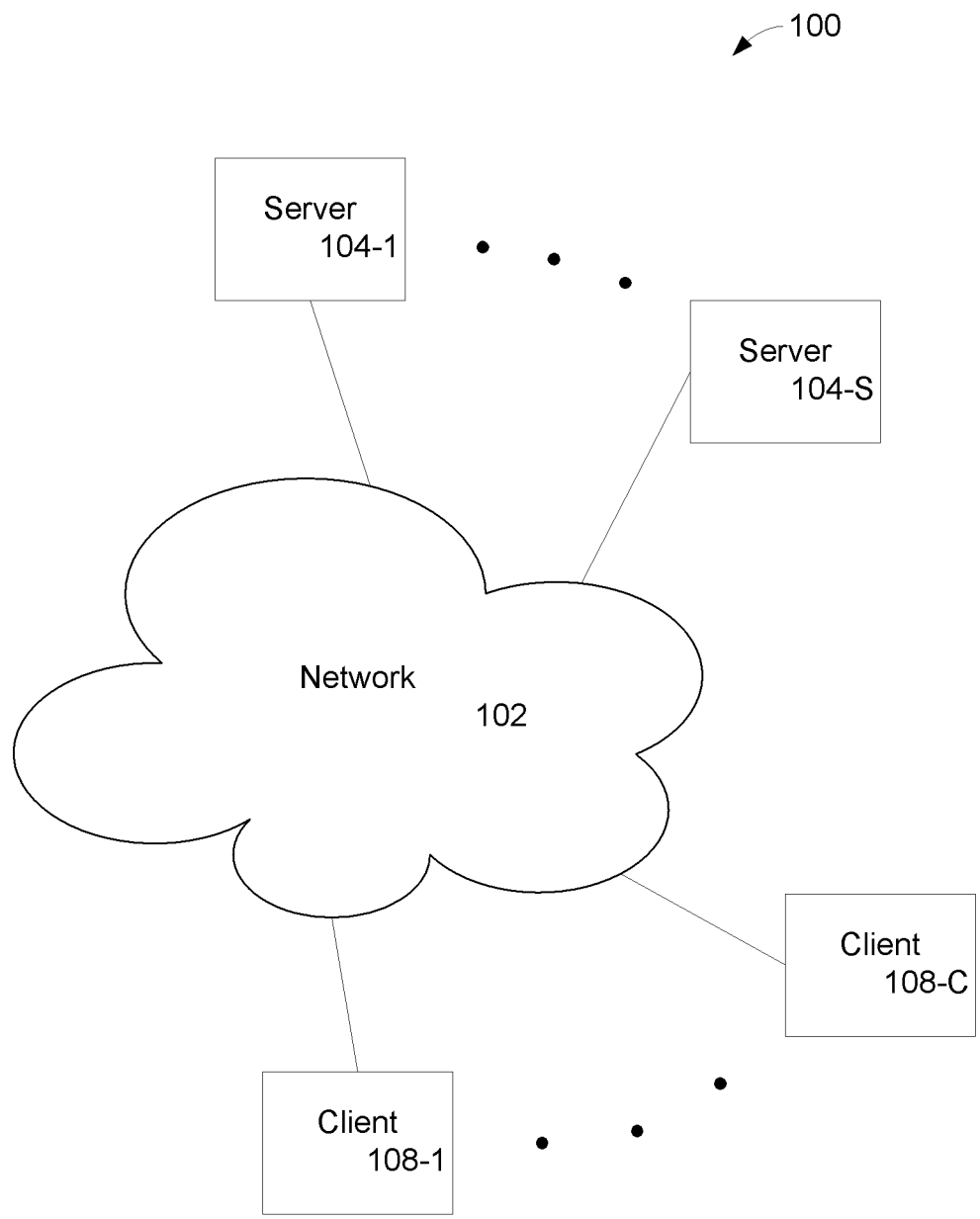
FIG. 1 illustrates a network environment in which the method and apparatus of the invention may be implemented.

For illustration purposes, the techniques of the present invention will be illustrated using an 18-port Serial Rapid IO (sRIO) Gen2 Switch. The techniques may be applied to other switches and other scenarios. In one embodiment of the invention, an 18-port Serial Rapid IO (sRIO) Gen2 Switch is to be implemented to achieve very high performance (up to 360 Gbit) with minimum latency (<30 ns excluding sRIO protocol stack delay) to meet wireless infrastructure customer's requirements for WCDMA/LTE Base Stations.

In one embodiment of the invention, in order to achieve optimized performance under any traffic conditions, a technique has been developed to resolve traffic congestion through Time-to-Live (TTL).

In one embodiment of the invention, Time-to-Live will allow each packet to be set with a pre-defined Time-to-Live interval while being written into Egress Port's Final Buffer. If the packets cannot be transmitted out before TTL timeout, they will be discarded through the congested Egress port. As a result, back pressure can be relieved which will allow the traffic to go through all other non-faulty ports (as well as the faulty port after it is back to being operational).

In one embodiment of the invention, a "purge Virtual Output Queue (VOQ) pointer" scheme is used instead of a "flush packet scheme" to resolve congestion. Through this scheme, each packet can be discarded much faster as each packet's memory pointer can be discarded within a single cycle instead of many cycles needed to flush a complete packet. Congestion can be resolved in a timely manner with minimum impact to network performance.

In one embodiment of the invention, Time to Live (TTL) with packet discard can be used for fault and congestion management.

In one embodiment of the invention, when a remote connected device fails to process the received traffic, back pressure could be applied to Ingress Port therefore created blocking condition to all the other non-congested Output Ports, however with TTL with packet discard will purge each packet's memory pointer that encountered TTL timeout and allow the traffic from Ingress to go through all the non-congested output ports. In addition, after remote device is back up, it can continue receiving and processing incoming packets.

In one embodiment of the invention, when a Switch Egress Port fails to forward the packets to a remote device due to some fatal error condition, TTL with packet discard can also allow the traffic to be forwarded from Ingress to all other non-congested output ports. In addition, after Egress port is back up, it can continue forwarding packets to the connected device.

In one embodiment of the invention, purging packet pointers is used instead of flushing packets which allows congestion to be resolved much faster with minimum interference to network traffic.

In one embodiment of the invention, each packet being stored into Egress Port's Final Buffer will have an associated TTL timeout counter being initialized to a pre-programmed value.

In one embodiment of the invention, TTL clock tick (e.g. 1.6 us) will be used to decrement TTL timeout counter for each stored packets. If the packet gets transmitted before TTL timeout, the corresponding TTL timeout counter will be reset. Otherwise, the packet will be discarded.

In one embodiment of the invention, while a packet is being written into Egress Port's Final Buffer, each VC0 with different priority level will have a VOQ to store packet's memory page pointer. Each VC1 and VC5 will have a VOQ to store packet's memory write address. For a VC0 packet, the memory page being used to store the packet will associate with a TTL timeout counter. For VC1/VC5 packet, the VOQ Write Pointer being used to store the packet's memory address will associate with a TTL timeout counter.

In one embodiment of the invention, upon TTL timeout, each VOQ entry that encountered TTL timeout will be purged (VC0 in priority order followed by VC1 & VC5).

In one embodiment of the invention, the associated memory buffer will be released for future use and each VOQ's read pointer will be realigned to top entry pointing to the first non-TTL timeout packet.

In one embodiment of the invention, TTL timeout handling needs to wait if packet transmission/retransmission is in progress or if there is any packet outstanding.

In one embodiment of the invention, when retransmission request is returned, all the outstanding packets that encountered TTL timeout can be discarded while performing retransmit mapper look up with VOQ read pointer realignment.

In one embodiment of the invention, a TTL timer starts at end of packet (EOP) received into the Egress Port's Final Buffer (FB).

Egress Final Buffer Virtual Output Queue

In one embodiment of the invention, each Egress Port's Final Buffer has one VOQ set with 10 VOQs. 8 for VC0 to represent 4 different priorities with CRF bit set or reset, 1 each for VC1 & VC5.

In one embodiment of the invention, each VOQ entry stores a memory page pointer for VC0 packet or memory buffer address for VC1/VC5 packets while the packet is being written into Final Buffer.

In one embodiment of the invention, based on the selected memory page pointer or buffer address, write address will be generated and incremented accordingly to write the packet data into Final Buffer.

In one embodiment of the invention, the stored memory page pointer or buffer address will be used to generate Final Buffer read address while the VOQ is being selected to read out the packet.

In one embodiment of the invention, if the packet is to be discarded due to TTL timeout, each VOQ entry with TTL timeout indication will be purged with its VOQ Read Pointer moved back to skip the discard VOQ entry.

Figure 3:
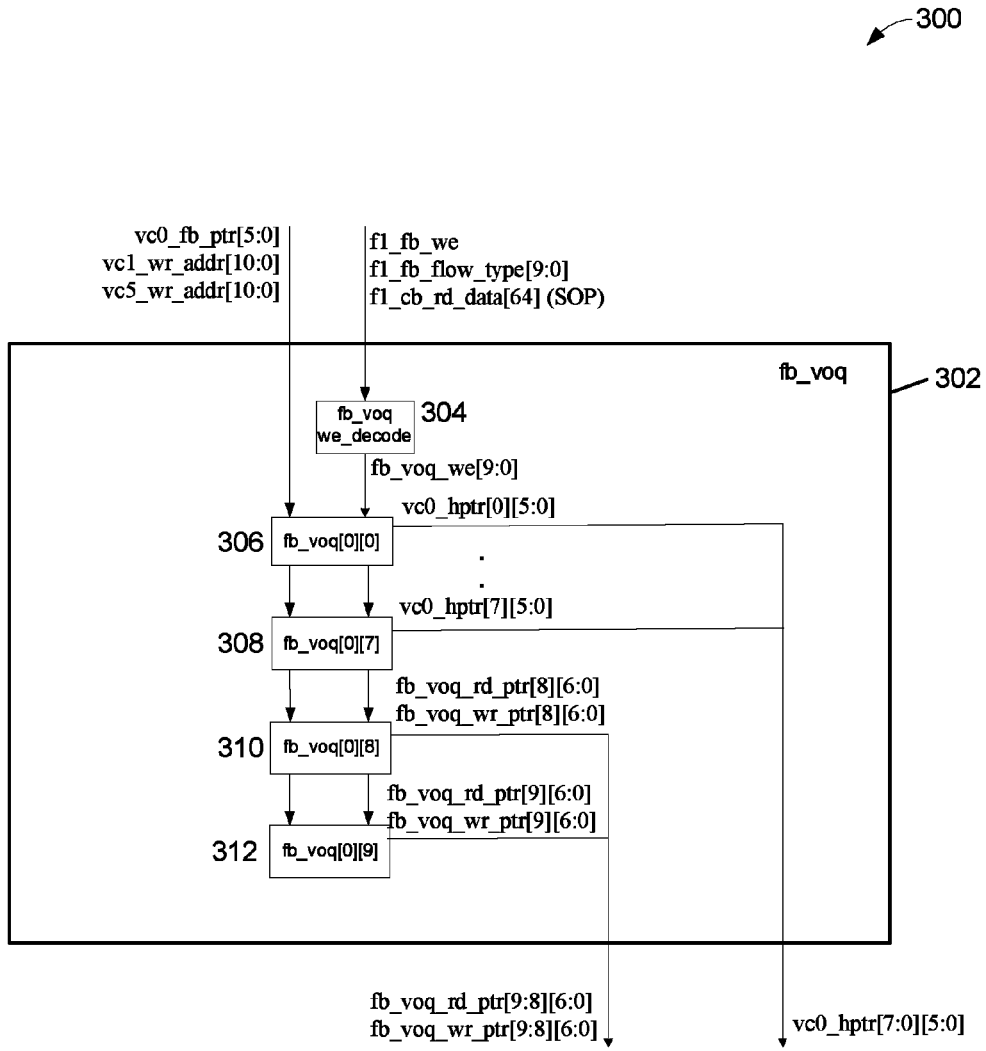
FIG. 3 illustrates one embodiment of the invention showing Egress Final Buffer Virtual Output Queue.

FIG. 3 illustrates, generally at 300, one embodiment of the invention showing Egress Final Buffer Virtual Output Queue.

At 302 is a Final Buffer VOQ (fb_voq), at 304 is a decode logic block (fb_voq we_decode), at 306 is a queue (fb_voq[0][0]), at 308 is a queue (fb_voq[0][7]), at 310 is a queue (fb_voq[0][8]), and at 312 is a queue (fb_voq[0][9]).

In one embodiment of the invention, for example as shown in FIG. 3, fb_voq_we[7:0] will be used to write VC0 packet's memory page pointer (vc0_fb_ptr[5:0]) to the respective VC0 VOQ being selected through f1_fb_flow_type[7:0] (corresponding to each priority level) at SOP cycle.

In one embodiment of the invention, for example as shown in FIG. 3, fb_voq_we[9:8] will be used to write VC5/VC1 packet's memory write address (vc5_wr_addr[10:0] & vc1_wr_addr[10:0]) to the respective VC5/VC1 VOQ being selected through f1_fb_flow_type[9:8] at SOP cycle.

In one embodiment of the invention, for example as shown in FIG. 3, while writing a packet into Final Buffer, vc0_fb_ptr[5:0] can be used as an index to write the TTL timeout value into the selected VC0 TTL Timeout Counter. fb_voq_wr_ptr[9:8][6:0] can be used as an index to write the TTL timeout value into the selected VC5/VC1 TTL Timeout Counter.

In one embodiment of the invention, for example as shown in FIG. 3, vc0_hptr[7:0][5:0] are the head of line memory page pointer for each priority level of VC0, which can be used to select and clear the respective VC0 TTL timeout counter upon TTL timeout while the VOQ entry is being purged.

In one embodiment of the invention, for example as shown in FIG. 3, fb_voq_rd_ptr[9:8][6:0] can be used to select and clear the respective VC5/VC1 TTL timeout counter upon TTL timeout while the VOQ entry is being purged.

Egress Final Buffer TTL Counters

In one embodiment of the invention, Time to Live (TTL) Timeout Counter will be implemented on each Egress Port's Final Buffer for fault and congestion management. Each packet being written into Final Buffer will cause the associated TTL Timeout Counter to be loaded with pre-programmed timeout value (zero value will disable TTL Timeout Counter), which will then be enabled to count down. Each time a TTL timer tick occurs (~1.6 us), the corresponding TTL Timeout Counter will be decremented by 1. If the packet gets transmitted out of Final Buffer before timeout (count down to 0), the corresponding TTL Timeout Counter will be reset to maximum value and gets disabled (This counter will stay disabled until the subsequent packets which uses the same memory block being loaded into Final Buffer). Otherwise, timeout will occur which will invoke TTL Timeout Handler to discard the stored packet by purging its VOQ entry.

In one embodiment of the invention, since Final Buffer can accommodate up to 34 VC0 packets through page based memory buffers, 64 VC1 packets and 64 VC5 packets through pointer (FIFO) based memory buffers, each packet being stored into Final Buffer will have a TTL Timeout Counter associated with it. For VC0 packet, each TTL Timeout Counter is accessed through the memory page pointer being allocated to the VC0 packet. For VC1 and VC5 packets, each TTL Timeout Counter is accessed through the corresponding VC's VOQ Pointer with its entry being used to store the packet's memory buffer address.

The following sections describe VC0/VC1/VC5 TTL Timeout Counters, Write/Clear Decoder and Timeout Generator along with TTL Timeout Handler.

Figure 4:
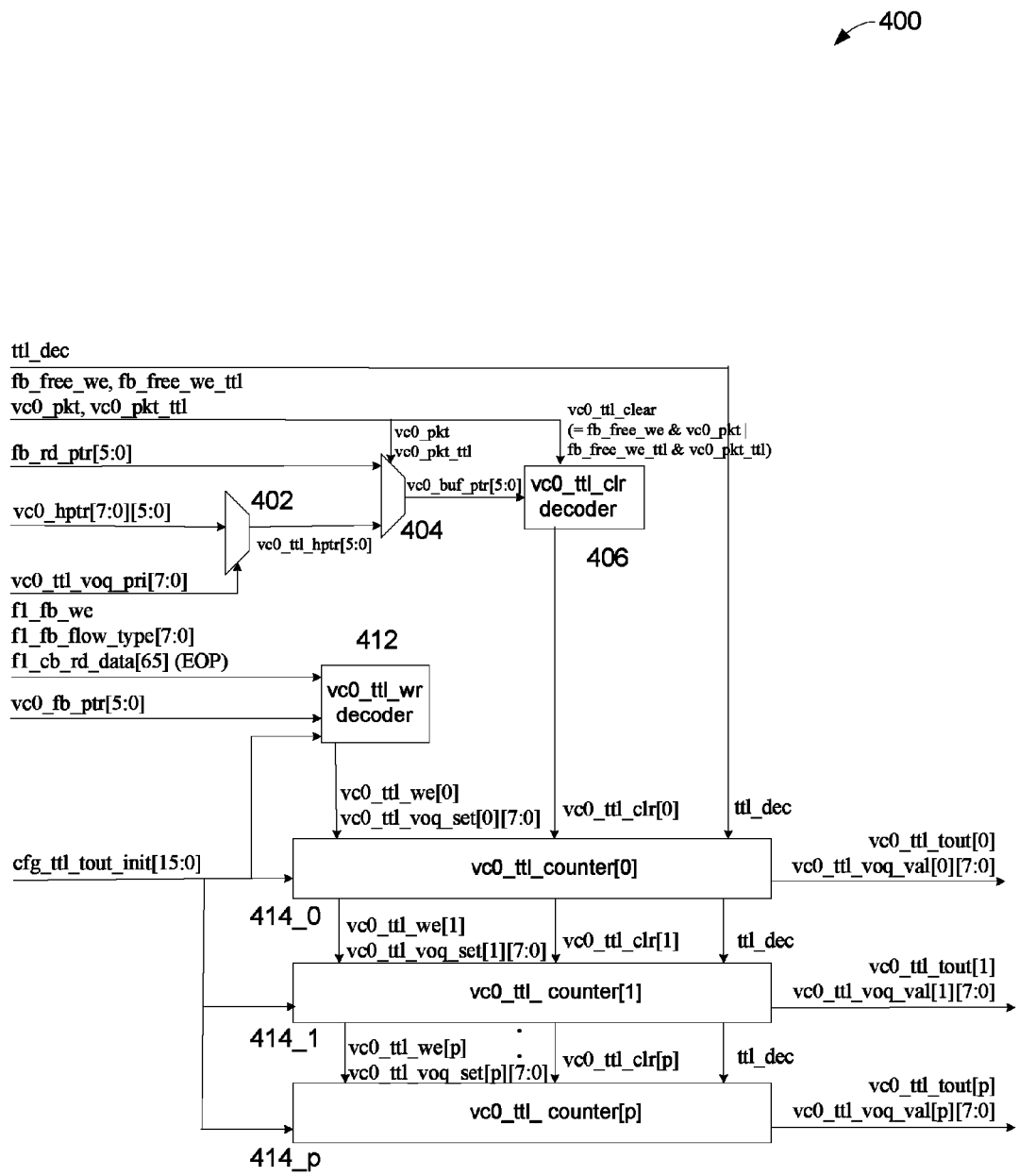
FIG. 4 illustrates one embodiment of the invention showing Final Buffer VC0 TTL Timeout Counter.

FIG. 4 illustrates, generally at 400, one embodiment of the invention showing Final Buffer VC0 TTL Timeout Counter.

At 402 is a selection logic block, at 404 is a selection logic block having two inputs, at 406 is a decoder logic block (vc0_ttl_clr decoder), at 412 is a decoder logic block (vc0_ttl_wr decoder), at 414_0 is counter logic block (vc0_ttl_counter[0]), at 414_1 is counter logic block (vc0_ttl_counter[1]), and at 414_p is a counter logic block (vc0_ttl_counter[p]).

In one embodiment of the invention, for example as shown in FIG. 4, each time a VC0 packet is being written into Final Buffer, cfg_ttl_tout_init[15:0] will be loaded into the corresponding vc0_ttl_counter being selected by vc0fb_ptr[5:0] at EOP cycle and the counter will be enabled to count down on each TTL timer tick (ttl_dec).

In one embodiment of the invention, for example as shown in FIG. 4, vc0_ttl_voq_val[x] (x:7-0 for each VC0 priority level) will also be set for the corresponding TTL Timeout Counter based on the packet's priority level.

In one embodiment of the invention, for example as shown in FIG. 4, if the packet gets transmitted (or discarded due to retransmission) before TTL timeout, fb_free_we will be asserted to disable the corresponding TTL Timeout Counter being selected through fb_rd_ptr[5:0] (retrieved from Retransmission Mapper). This pointer is selected through packet index returned from Link Partner after successful transmission or when h2_tx_pkt_clr is returned to indicate a successfully packet transmission or upon retransmission request.

In one embodiment of the invention, for example as shown in FIG. 4, if the packet is still in Final Buffer and encountered timeout, vc0_ttl_tout[p] indication (p=0~33) will be asserted. fb_free_we_ttl will be generated through TTL Timeout Handler to disable the corresponding TTL Timeout Counter. The Counter is selected through VC0 head of line pointer (vc0_hptr[x][5:0]. X:7-0 for each VC0 priority level) from the top entry of the highest priority VC0 VOQ.

VC0 TTL Write Decoder

In one embodiment of the invention, the VC0 TTL Write Decoder is as follows:
for (i=0; i<=33; i=i+1)
vc0_ttl_we[i]=f1_fb_we & f1_cb_rd_data[65] & |(f1_fb_flow_type[7:0]) & (vc0_fb_ptr[5:0]==i);
for (i=0; i<=33; i=i+1)
for (j=0; j<=7; j=j+1)
vc0_ttl_voq_set[i][j]=f1_fb_we & f1_cb_rd_data[65] & f1_fb_flow_type[j] & (vc0_fb_ptr[5:0]==j);

In one embodiment of the invention, vc0_ttl_we[i] is generated at EOP cycle (f1_cb_rd_data[65]=1) to write the pre-programmed TTL Timeout value to the corresponding VC0 TTL Timeout Counter being selected by VC0 memory page pointer (vc0fb_ptr[5:0]).

In one embodiment of the invention, vc0_ttl_voq_set[i][j] is generated at EOP cycle to set the VOQ priority level for the corresponding VC0 TTL Timeout Counter. This information can be used to generate vc0_ttl_voq_pri[7:0] for TTL Timeout Handler to select the highest priority VC0 VOQ with packet encountered TTL timeout to be discarded.

VC0 TTL Clear Decoder

In one embodiment of the invention, the VC0 TTL Clear Decoder is as follows:

| vc0_ttl_voq_pri[7:0] | vc0_ttl_hptr[5:0] |
|---|---|
| 1000_0000 | vc0_hptr[7][5:0] |
| 0100_0000 | vc0_hptr[6][5:0] |
| 0010_0000 | vc0_hptr[5][5:0] |
| 0001_0000 | vc0_hptr[4][5:0] |
| 0000_1000 | vc0_hptr[3][5:0] |
| 0000_0100 | vc0_hptr[2][5:0] |
| 0000_0010 | vc0_hptr[1][5:0] |
| 0000_0001 | vc0_hptr[0][5:0] | vc0_buf_ptr[5:0]=(vc0_pkt_ttl) ? vc0_ttl_hptr[5:0]: (vc0_pkt) ? fb_rd_ptr[5:0]: 0;
vc0_ttl_clear=fb_free_we & vc0_pkt | fb_free_we_ttl & vc0_pkt_ttl;
for (i=0; i<=33; i=i+1)
vc0_ttl_clr[i]=vc0_ttl_clear & (vc0_buf_ptr[5:0]==i);

In one embodiment of the invention, vc0_ttl_clr[i] is generated to disable the corresponding VC0 TTL Timeout Counter being selected by the memory page pointer (vc0_buf_ptr[5:0]).

In one embodiment of the invention, if the packet gets transmitted successfully or gets discarded during retransmission before TTL Timeout, memory page pointer (fb_rd_ptr [5:0]) is retrieved through Retransmission Mapper being indexed by the packet index returned from Link Partner. If the packet is still in VOQ (not becoming outstanding packet yet) and encountered TTL timeout, memory page pointer is retrieved from the highest priority VOQ's top entry (vc0_ttl_hptr[5:0]) that encountered timeout.

In one embodiment of the invention, after the TTL Timeout Counter is disabled, it will be re-enabled when the subsequent packet is being written into the Final Buffer using the same memory page.

VC0 TTL Timeout Counter

In one embodiment of the invention, the VC0 TTL Timeout Counter is as follows:
for (i=0; i<=33; i=i+1)
if (cfg_ttl_tout_en)
{if (vc0_ttl_we[i]) {vc0_ttl_count[i]=cfg_ttl_tout_init[15: 0]; vc0_ttl_en[i]=1'b1;}
else if ((vc0_ttl_clr[i]) {vc0_ttl_count[i]=16'ffff; vc0_ttl_en [i]=1'b0;}
else if (ttl_dec & vc0_ttl_en[i]) vc0_ttl_count[i]= vc0_ttl_count[i]–1'b1;
else if (vc0_ttl_tout[i] & vc0_ttl_en[i]) {vc0_ttl_count[i]= vc0_ttl_count[i]; vc0_ttl_en[i]=1'b0;}
} Note: cfg_ttl_tout_en=(cfg_ttl_tout_init[15:0] !=16'h0)

VC0 TTL Timeout VOQ Valid Indication

In one embodiment of the invention, the VC0 TTL Timeout VOQ Valid Indication is as follows:
for (i=0; i<=33; i=i+1)
for (j=0; j<7; j=j+1)
if (vc0_ttl_voq_set[i][j]) vc0_ttl_voq[i][j]=1'b1;
else if (vc0_ttl_clr[i]) vc0_ttl_voq[i][j]=1'b0;
for (i=0; i<=33; i=i+1)
for (j=0; j<7; j=j+1)
if (vc0_ttl_clr[i]) vc0_ttl_voq_val[i][j]=1'b0;
else if (vc0_ttl_voq[i][j] & vc0_ttl_tout[i]) vc0_ttl_voq_val [i][j]=1'b1;
for (m=0; m<=7; m=m+1) vc0_ttl_voq_valid[m]=| (vc0_ttl_voq_val[p:0][m]); //p=33

| vc0_ttl_voq_valid[7:0] | vc0_ttl_voq_pri[7:0] |
|---|---|
| 1xxx_xxxx | 1000_0000 |
| 01xx_xxxx | 0100_0000 |
| 001x_xxxx | 0010_0000 |
| 0001_xxxx | 0001_0000 |
| 0000_1xxx | 0000_1000 |
| 0000_01xx | 0000_0100 |
| 0000_001x | 0000_0010 |
| 0000_0001 | 0000_0001 |

VC0 TTL Timeout Generation

In one embodiment of the invention, the VC0 TTL Timeout Generation is as follows:
for (i=0; i<=33; i=i+1)
vc0_ttl_tout[i]=(vc0_ttl_count[i]==0);
for (i=0; i<=33; i=i+1)
vc0_ttl_timeout=|(vc0_ttl_tout[i]);

In one embodiment of the invention, vc0_ttl_count[i] will be enabled (vc0_ttl_en[i]=1'b1) and loaded with pre-programmed value (cfg_ttl_tout_init[15:0]) if vc0_ttl_we[i] is asserted and the pre-programmed value is not zero. This Counter will be decremented by 1 each time a TTL timer tick (ttl_dec) occurs. It will be disabled upon TTL timeout or if vc0_ttl_clr[i] is asserted (either the packet got transmitted successfully or gets discarded during retransmission).

In one embodiment of the invention, vc0_ttl_voq[i][j] will be set to indicate the packet's VOQ priority level for each specific memory page being used to write the packet into Final Buffer. vc0_ttl_voq_val[i][j] will be asserted for the memory page that encountered TTL timeout while the corresponding vc0_ttl_voq[i][j] is set. All the indications belong to the same VOQ will be ORed together. The indication will be used by TTL Timeout Handler to scan each VC0 VOQ which encountered TTL timeout in sRIO defined priority order. After handling TTL Timeout, this indication will be cleared when vc0_ttl_clr[i] is asserted. vc0_ttl_voq_pri[7:0] will be generated as the priority indication of vc0_ttl_voq_valid[7:0].

In one embodiment of the invention, vc0_ttl_tout[i] will be asserted as timeout indication if the corresponding memory page's TTL Timeout Counter counts down to 0. The will be ORed together to generate vc0_ttl_timeout indication if any of the VC0 TTL Timeout Counter encountered timeout.

Figure 5:
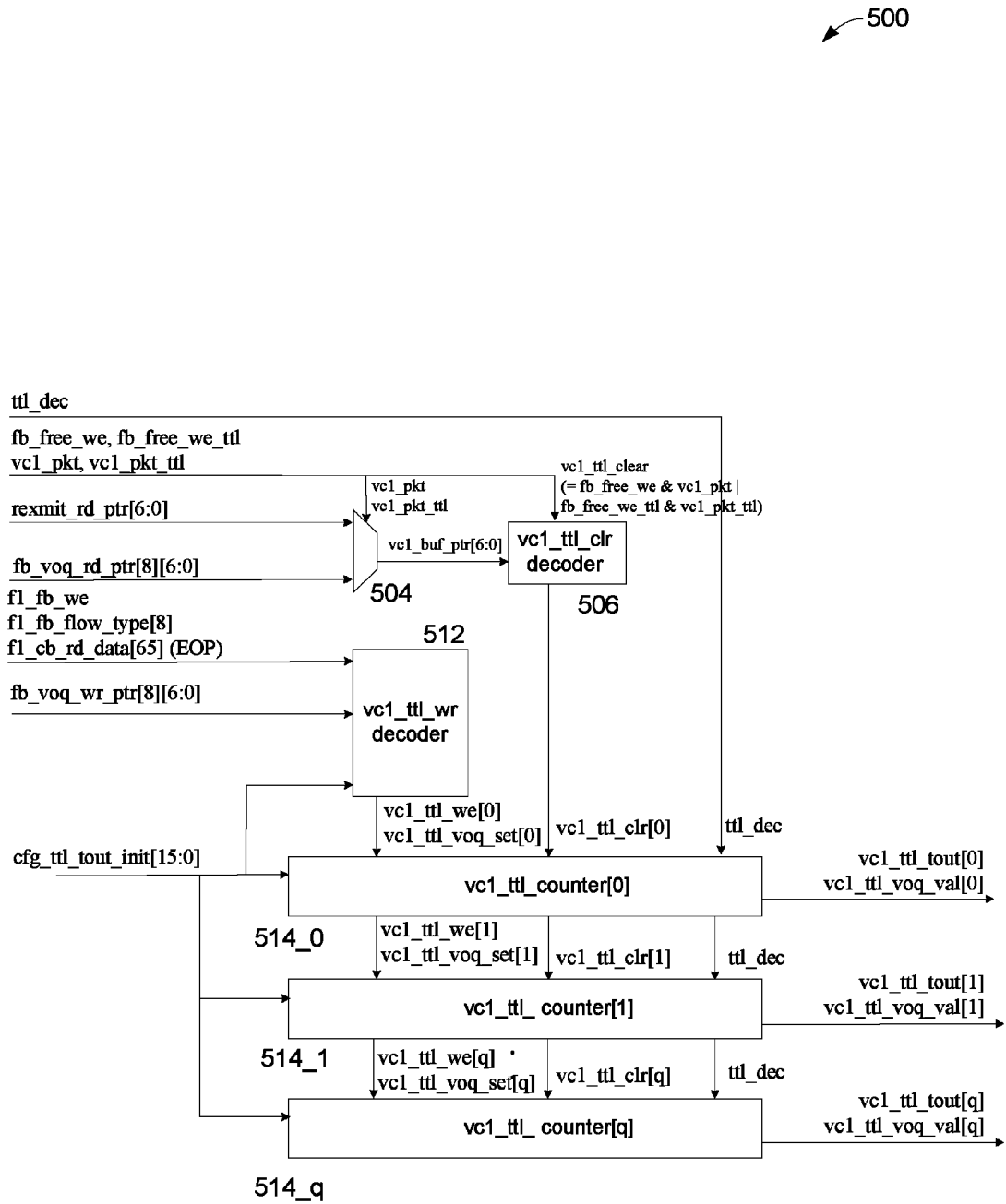
FIG. 5 illustrates one embodiment of the invention showing Final Buffer VC1 TTL Timeout Counter.

FIG. 5 illustrates, generally at 500, one embodiment of the invention showing Final Buffer VC1 TTL Timeout Counter.

At 504 is a selection logic block having two inputs, at 506 is a decoder logic block (vc1_ttl_clr decoder), at 512 is a decoder logic block (vc1_ttl_wr decoder), at 514_0 is counter logic block (vc1_ttl_counter[0]), at 514_1 is counter logic block (vc1_ttl_counter[1]), and at 514_q is a counter logic block (vc1_ttl_counter[q]).

In one embodiment of the invention, for example as shown in FIG. 5, each time a VC1 packet is being written into Final Buffer, cfg_ttl_tout_init[15:0] will be loaded into the corresponding vc1_ttl_counter being selected by fb_voq_wr_ptr[8][6:0] (VC1 VOQ's Write Pointer) at EOP cycle and the counter will be enabled to count down on each TTL timer tick (ttl_dec).

In one embodiment of the invention, for example as shown in FIG. 5, vc1_ttl_voq_val[q] (where q=0~64) will also be set for the TTL Timeout Counter being selected through the corresponding VOQ's write pointer (fb_voq_wr_ptr[8][6:0]).

In one embodiment of the invention, for example as shown in FIG. 5, if the packet gets transmitted (or discarded due to retransmission) before TTL timeout, fb_free_we will be asserted which will generate vc1_ttl_clear to disable the corresponding TTL Timeout Counter. The Counter is selected through rexmit_rd_ptr[6:0] (retrieved from Retransmission Mapper which is being selected through packet index returned from Link Partner after the packet is being transmitted successfully or request for retransmission).

In one embodiment of the invention, for example as shown in FIG. 5, if the packet is still in the Final Buffer and encountered TTL timeout, vc1_ttl_tout[q] indication will be asserted. fb_free_we_ttl will be asserted from TTL handler which will generate vc1_ttl_clear to disable the corresponding VC1 TTL Timeout Counter which is selected through VC1 VOQ's read pointer (fb_voq_rd_ptr[8][6:0]).

VC1 TTL Write Decoder

In one embodiment of the invention, the VC1 TTL Write Decoder is as follows:
for (i=0; i<=64; i=i+1)
vc1_ttl_we[i]=f1_fb_we & f1_cb_rd_data[65] & f1_fb_flow_type[8]) & (fb_voq_wr_ptr[8][6:0]==i);
vc1_ttl_voq_set[i]=vc1_ttl_we[i];

In one embodiment of the invention, vc1_ttl_we[i] is generated at EOP cycle to write the pre-programmed TTL Timeout value into the corresponding VC1 TTL Timeout Counter being selected through VC1 VOQ Write pointer (fb_voq_wr_ptr[8][6:0]).

In one embodiment of the invention, these signals can also be used to set VC1 VOQ valid indication (vc1_ttl_voq_val[x] for the corresponding TTL Timeout Counter. This information can then be used to generate vc1_ttl_voq_valid for TTL Timeout Handler to identify VC1 VOQ that encountered TTL timeout and therefore needs to be discarded.

VC1 TTL Clear Decoder

In one embodiment of the invention, the VC1 TTL Clear Decoder is as follows:
vc1_buf_ptr[6:0]=(vc1_pkt_ttl) ? fb_voq_rd_ptr[8][6:0]: rexmit_rd_ptr[8][6:0];
vc1_ttl_clear=fb_free_we & vc1_pkt I fb_free_we_ttl & vc1_pkt_ttl;
for (i=0; i<=64; i=i+1)
vc1_ttl_clr[i]=vc1_ttl_clear & (vc1_buf_ptr[6:0]==i);

In one embodiment of the invention, vc1_ttl_clr[i] is generated to disable the corresponding VC1 TTL Timeout Counter being selected through VC1 VOQ read pointer (vc1_buf_ptr[6:0]).

In one embodiment of the invention, if the packet gets transmitted successfully or gets discarded during retransmission before TTL Timeout, VC1 VOQ read pointer (rexmit_rd_ptr[8][6:0]) is retrieved from Retransmission Mapper being selected through Packet Index returned from Link Partner. If the packet is still in VOQ (not becoming outstanding packet yet) and encountered TTL timeout, VOQ read pointer (fb_voq_rd_ptr[8][6:0]) is retrieved from VC1 VOQ's top entry's read pointer which encountered TTL timeout.

In one embodiment of the invention, after the respective VC1 TTL Timeout Counter is disabled, it will be re-enabled when the subsequent packet is being written into the Final Buffer using the same VOQ write pointer.

VC1 TTL Timeout Counter

In one embodiment of the invention, the VC1 TTL Timeout Counter is as follows:
for (i=0; i<=64; i=i+1)
if (cfg_ttl_tout_en)
{if (vc1_ttl_we[i]) {vc1_ttl_count[i]=cfg_ttl_tout_init[15:0]; vc1_ttl_en[i]=1'b1;}
else if ((vc1_ttl_clr[i]) {vc1_ttl_count[i]=16'ffff; vc1_ttl_en[i]=1'b0;}
else if (ttl_dec & vc1_ttl_en[i]) vc1_ttl_count[i]=vc1_ttl_count[i]-1'b1;
else if (vc1_ttl_tout[i] & vc1_ttl_en[i]) {vc1_ttl_count[i]=vc1_ttl_count[i]; vc1_ttl_en[i]=1'b0;}
}

VC1 TTL Timeout VOQ Valid Indication

In one embodiment of the invention, the VC1 TTL Timeout VOQ Valid Indication is as follows:
for (i=0; i<=64; i=i+1)
if (vc1_ttl_voq_set[i]) vc1_ttl_voq[i]=1'b1;
else if (vc1_ttl_clr[i]) vc1_ttl_voq[i]=1'b0;
for (i=0; i<=64; i=i+1)
if (vc1_ttl_clr[i]) vc1_ttl_voq_val[i]=1'b0;
else if (vc1_ttl_voq[i] & vc1_ttl_tout[i]) vc1_ttl_voq_val[i]=1'b1;
for (q=0; q<=64; q=q+1)
vc1_ttl_voq_valid=|(vc1_ttl_voq_val[q]);

VC1 TTL Timeout Generation

In one embodiment of the invention, the VC1 TTL Timeout Generation is as follows:
for (i=0; i<=64; i=i+1)
vc1_ttl_tout[i]=(vc1_ttl_count[i]==0);
for (i=0; i<=64; i=i+1)
vc1_ttl_timeout=|(vc1_ttl_tout[i]);

In one embodiment of the invention, vc1_ttl_count[i] will be enabled (vc1_ttl_en[i]=1'b1) and loaded with pre-programmed value (cfg_ttl_tout_init[15:0]) if vc1_ttl_we[i] is asserted and the programmed value is not zero. This Counter will be decremented by 1 each time a TTL timer tick (ttl_dec) is active. It will be disabled upon timeout or if vc1_ttl_clr[i] is asserted (either the packet got transmitted successfully or being discarded during retransmission).

In one embodiment of the invention, vc1_ttl_voq[i] will be set when the packet which uses the specific VOQ entry is being written into Final Buffer. vc1_ttl_voq_val[i] will be asserted for the packet that encountered TTL timeout with the corresponding vc1_ttl_voq[i] being set. All the indications belong to VC1 VOQ will be ORed together which will be used by TTL Timeout Handler to scan the VC1 VOQ that encountered TTL timeout. This indication will be cleared upon vc1_ttl_clr[i] assertion after TTL Timeout has been handled.

In one embodiment of the invention, vc1_ttl_tout[i] will be asserted as timeout indication if the corresponding VC1 TTL Timeout Counter counts down to 0.

Figure 6:
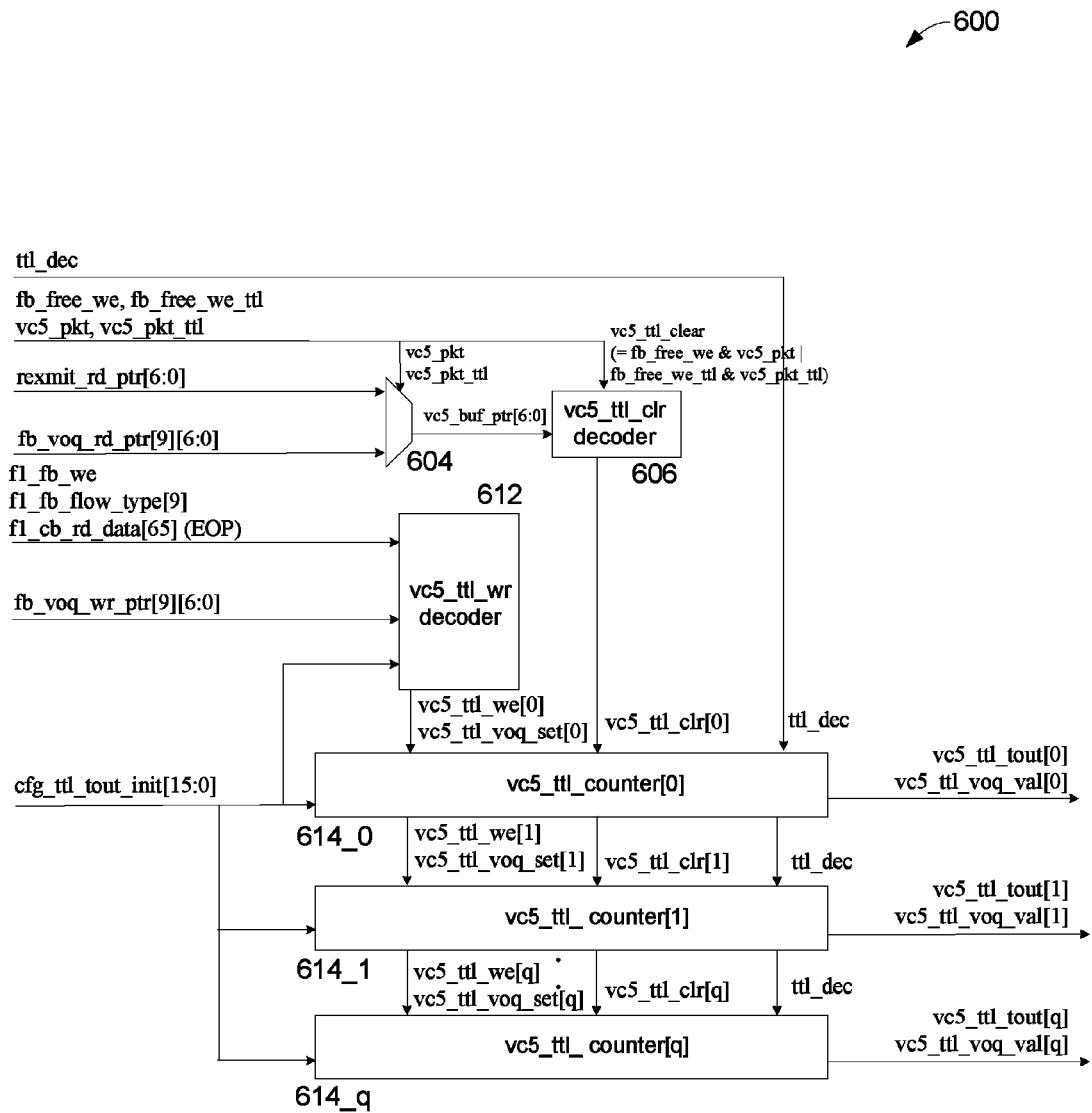
FIG. 6 illustrates one embodiment of the invention showing Final Buffer VC5 TTL Timeout Counter.

FIG. 6 illustrates, generally at 600, one embodiment of the invention showing Final Buffer VC5 TTL Timeout Counter.

At 604 is a selection logic block having two inputs, at 606 is a decoder logic block (vc5_ttl_clr decoder), at 612 is a decoder logic block (vc5_ttl_wr decoder), at 614_0 is counter logic block (vc5_ttl_counter[0]), at 614_1 is counter logic block (vc5_ttl_counter[1]), and at 614_q is a counter logic block (vc5_ttl_counter[q]).

In one embodiment of the invention, for example as shown in FIG. 6, each time a VC5 packet is being written into Final Buffer, cfg_ttl_tout_init[15:0] will be loaded into the corresponding vc5_ttl_counter being selected through fb_voq_wr_ptr[9][6:0] at EOP cycle and the counter will be enabled to count down on each TTL timer tick (ttl_dec).

In one embodiment of the invention, for example as shown in FIG. 6, vc5_ttl_voq_val will also be set for the corresponding TTL Timeout Counter.

In one embodiment of the invention, for example as shown in FIG. 6, if the packet gets transmitted (or discarded due to retransmission) before TTL timeout, fb_free_we will be asserted which will generate vc5_ttl_clear to disable the corresponding TTL Timeout Counter. The Counter is selected through rexmit_rd_ptr[6:0] (retrieved from Retransmission Mapper which is selected through packet index returned from Link Partner after successful transmission or encountered retransmission request).

In one embodiment of the invention, for example as shown in FIG. 6, if the packet is still in Final Buffer and encountered TTL timeout, vc5_ttl_tout[q] indication will be asserted. fb_free_we_ttl will be asserted which will generate vc5_ttl_clear to disable the corresponding TTL Timeout Counter which is selected through VC5 VOQ top entry's read pointer (fb_voq_rd_ptr[9][5:0]).

VC5 TTL Write Decoder

In one embodiment of the invention, the VC5 TTL Write Decoder is as follows:
for (i=0; i<=64; i=i+1)
vc5_ttl_we[i]=f1_fb_we & f1_cb_rd_data[65] & f1_fb_flow_type[9]) & (fb_voq_wr_ptr[9][6:0]==i);
vc5_ttl_voq_set[i]=vc5_ttl_we[i];

In one embodiment of the invention, vc5_ttl_we[i] is generated to write the pre-programmed TTL Timeout value into the corresponding VC5 TTL Timeout Counter being selected through the VC5 VOQ Write pointer (fb_voq_wr_ptr[9][6:0]).

In one embodiment of the invention, these signals can also be used to set VC5 VOQ valid indication (vc5_ttl_voq_val[x]) for the corresponding VC5 TTL Timeout Counter. This information can then be used to generate vc5_ttl_voq_valid for TTL Timeout Handler to identify VC5 VOQ entry that encountered TTL timeout and therefore needs to be discarded.

VC5 TTL Clear Decoder

In one embodiment of the invention, the VC5 TTL Clear Decoder is as follows:
vc5_buf_ptr[6:0]=(vc5_pkt_ttl) ? fb_voq_rd_ptr[9][6:0]: rexmit_rd_ptr[9][6:0];
vc5_ttl_clear=fb_free_we & vc5_pkt I fb_free_we_ttl & vc5_pkt_ttl;

for (i=0; i<=64; i=i+1)
vc5_ttl_clr[i]=vc5_ttl_clear & (vc5_buf_ptr[6:0]==i);

In one embodiment of the invention, vc5_ttl_clr[i] is generated to disable the corresponding TTL Timeout Counter being selected through VC5 VOQ read pointer (vc5_buf_ptr[6:0]).

In one embodiment of the invention, if the packet gets transmitted successfully or being discarded during retransmission before TTL Timeout, VC5 VOQ read pointer (rexmit_rd_ptr[9][6:0]) is retrieved from Retransmission Mapper being selected through Packet Index returned from Link Partner. If the packet is still in VOQ (not becoming outstanding packet yet) and encountered TTL timeout, VC5 VOQ read pointer (fb_rd_voq_ptr[9][6:0]) is retrieved from VC5 VOQ top entry's read pointer that encountered TTL timeout.

In one embodiment of the invention, after VC5 TTL Timeout Counter is disabled, it will be re-enabled when the subsequent packet is being written into the Final Buffer using the same VOQ's write pointer.

VC5 TTL Timeout Counter

In one embodiment of the invention, the VC5 TTL Timeout Counter is as follows:
for (i=0; i<=64; i=i+1)
if (cfg_ttl_tout_en)
{if (vc5_ttl_we[i]) {vc5_ttl_count[i]=ttl_cfg_tout_init[15:0]; vc5_ttl_en[i]=1'b1;}
else if ((vc5_ttl_clr[i]) {vc5_ttl_count[i]=16'ffff; vc5_ttl_en[i]=1'b0;}
else if (ttl_dec & vc5_ttl_en[i]) vc5_ttl_count[i]= vc5_ttl_count[i]−1'b1;
else if (vc5_ttl_tout[i] & vc5_ttl_en[i]) {vc5_ttl_count[i]= vc5_ttl_count[i]; vc5_ttl_en[i]=1'b0;}
}

VC5 TTL Timeout VOQ Valid Indication

In one embodiment of the invention, the VC5 TTL Timeout VOQ Valid Indication is as follows:
for (i=0; i<=64; i=i+1)
if (vc5_ttl_voq_set[i]) vc5_ttl_voq[i]=1'b1;
else if (vc5_ttl_clr[i]) vc5_ttl_voq[i]=1'b0;
for (i=0; i<=64; i=i+1)
if (vc5_ttl_clr[i]) vc5_ttl_voq_val[i]=1'b0;
else if (vc5_ttl_voq[i] & vc5_ttl_tout[i]) vc5_ttl_voq_val[i]= 1'b1;
for (q=0; q<=64; q=q+1)
vc5_ttl_voq_valid=|(vc5_ttl_voq_val[q]);

VC5 TTL Timeout Generation

In one embodiment of the invention, the VC5 TTL Timeout Generation is as follows:
for (i=0; i<=64; i=i+1)
vc5_ttl_tout[i]=(vc5_ttl_count[i]==0);
for (i=0; i<=64; i=i+1)
vc5_ttl_timeout=|(vc5_ttl_tout[i]);

In one embodiment of the invention, vc5_ttl_count[i] will be enabled (vc5_ttl_en[i]=1'b1) and loaded with pre-programmed value (ttl_cfg_tout_init[15:0]) if vc5_ttl_we[i] is asserted and the pre-programmed value is not zero. This Counter will be decremented by 1 each time a TTL timer tick (ttl_dec) is active. It will be disabled upon TTL timeout or if vc5_ttl_clr[i] is asserted (either the packet got transmitted successfully or being discarded during retransmission).

In one embodiment of the invention, vc5_ttl_voq[i] will be set when the packet which uses the specific VC5 VOQ entry is being written into Final Buffer. vc5_ttl_voq_val[i] will be asserted for the packet that encountered TTL timeout and the corresponding vc5_ttl_voq[i] is set. All the indications belong to VC5 VOQ will be ORed together which will be used by TTL Timeout Handler to scan the VC5 VOQ which encountered TTL timeout. This indication will be cleared upon vc5_ttl_clr[i] assertion after VC5 TTL Timeout has been handled.

In one embodiment of the invention, vc5_ttl_tout[i] will be asserted as timeout indication if the corresponding VC5 VOQ's TTL Timeout Counter counts down to 0.

Figure 7:
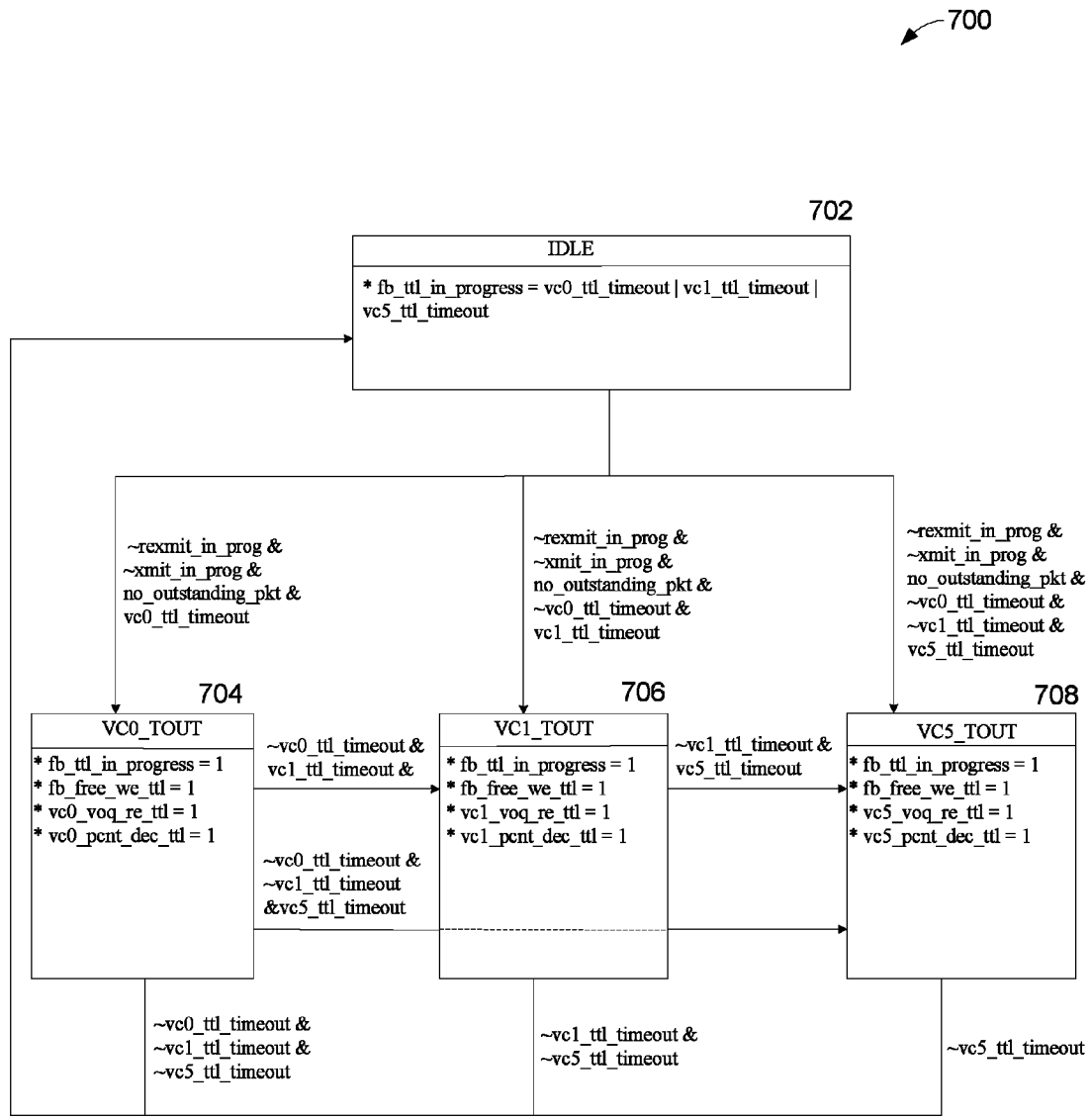
FIG. 7 illustrates one embodiment of the invention showing TTL Timeout Handler.

FIG. 7 illustrates, generally at 700, one embodiment of the invention showing TTL Timeout Handler.

At 702 is logic block (IDLE) and at 704 VC0_TOUT, at 706 VC1_TOUT, and at 708 VC5_TOUT. Within each block 702, 704, 706, and 708 are logic equations representing the generation of real-world signals. As may be seen from block 702, if ~rexmit_in_prog & ~xmit_in_prog & no_outstanding_pkt & vc0_ttl_timeout is asserted, it will enter block 704. In block 704, if ~vc0_ttl_timeout & ~vc1_ttl_timeout & ~vc5_ttl_timeout is asserted, it will enter block 702. One of skill in the art will recognize that the signal notations are self explanatory, for example, vc0_ttl_timeout denotes VC0 TTL Timeout signal, etc. The signals also follow standard assertion conventions, for example, ~vc5_ttl_timeout denotes NOT vc5_ttl_timeout, etc.

In one embodiment of the invention, for example as in FIG. 7, while in IDLE state, fb_ttl_in_progress indication will be asserted if there is any packet that encountered TTL timeout. If neither retransmission control nor packet transmission is active and there is no outstanding packet pending (being transmitted out but no ACK back yet), state will go to VC0_TOUT if there is any VC0 packet encountered TTL timeout, or go to VC1_TOUT if there is any VC1 packet encountered TTL timeout. Otherwise, state will go to VC5_TOUT for any VC5 packet that encountered TTL timeout.

In one embodiment of the invention, for example as in FIG. 7, in VC0_TOUT state, fb_free_we_ttl will be asserted to free up memory page pointer and clear the top entry of the VC0 TTL timeout. vc0_voq_re_ttl will be asserted to advance memory page pointer to the next VOQ entry. vc0_pcnt_dec_ttl will be asserted to decrement VC0 packet count. Above operation will repeat until all the VC0 packets with different priority that encountered TTL timeout have been discarded (in priority order).

In one embodiment of the invention, for example as in FIG. 7, after all the VC0 TTL timeout packets have been handled, state will go to VC1_TOUT if there is any VC1 TTL timeout indication is active. Otherwise, it will go to VC5_TOUT if there is any VC5 TTL timeout indication is active. State will go back to IDLE if neither VC1 TTL timeout indication is active nor VC5 TTL timeout indication is active.

In one embodiment of the invention, for example as in FIG. 7, in VC1_TOUT state, fb_free_we_ttl will be asserted to clear the top entry of the VC1 TTL timeout. vc1_voq_re_ttl will be asserted to advance to the next VOQ entry. vc1_pcnt_dec_ttl will be asserted to decrement VC1 packet count. Above operation will repeat until all the VC1 packets that encountered TTL timeout have been discarded.

In one embodiment of the invention, for example as in FIG. 7, after all the VC1 TTL timeout packets have been handled, state will go to VC5_TOUT if there is any VC5 TTL timeout indication is active, or go to IDLE if there is no VC5 TTL timeout indication is active.

In one embodiment of the invention, for example as in FIG. 7, in VC5_TOUT state, fb_free_we_ttl will be asserted to clear VC5 VOQ entry that encountered TTL timeout. vc5_voq_re_ttl will be asserted to advance VC5 VOQ entry. vc5_pcnt_dec_ttl will be asserted to decrement VC5 packet count.

In one embodiment of the invention, for example as in FIG. 7, above operation will be used to discard all the VC5 packets that encountered TTL timeout. After all the VC5 TTL timeout being handled, state will go to IDLE and wait for the next TTL timeout.

VOQ Pointer Purge vs. Packet Flush

Purging packet's VOQ pointers instead of flushing packets allows congestion to be resolved much faster with minimum interference to network traffic. For instance, in one embodiment of the invention, there are 34 VC0 packets with 35 dwords each being stored into the Final Buffer with the following VC0 VOQs being used to store VC0 packet's memory page pointer:

VOQ[7]: 6 VC0 priority 3 Critical Request Flow (CRF) 1 (highest priority)
VOQ[6]: 4 VC0 priority 3 CRF 0
VOQ[5]: 4 VC0 priority 2 CRF 1
VOQ[4]: 4 VC0 priority 2 CRF 0
VOQ[3]: 4 VC0 priority 1 CRF 1
VOQ[2]: 4 VC0 priority 1 CRF 0
VOQ[1]: 4 VC0 priority 0 CRF 1
VOQ[0]: 4 VC0 priority 0 CRF 0 (lowest priority)

If all the stored packets encountered TTL timeout, TTL Handler will be invoked to scan VOQ[7] first, it will purge 6 VOQ entries within VOQ[7] that encountered TTL timeout followed by 4 VOQ entries each for VOQ[6], VOQ[5] VOQ[0]. Each VOQ entry purge only took 1 cycle. For 34 VC0 packets, only 34 cycles will be needed to handle TTL timeout.

If packet flush was used, each packet has 35 dwords therefore it will take 34 cycles to flush a packet. Total of 34 packets would require 1190 cycles (34 packets×35 dwords) to complete TTL timeout handling. Based on above, it is clearly shown that Packet flush (1190 cycles) would take 35 times longer than the present invention's VOQ pointer purge (34 cycles). As a result, VOQ pointer purge minimizes network interference which is more desirable for congestion and fault management.

One of skill in the art is familiar with CRF (Critical Request Flow) and recalls that VC0 has 4 different priority levels (pri 3~pri 0 with 3 as the highest priority level and 0 the lowest priority level). Additionally, each priority level can have CRF bit set/reset which can further define the priority level within a given priority. For example, the following combinations are possible:

pri 3 CRF 1-pri 7
pri 3 CRF 0-pri 6
.
.
.
pri 0 CRF 1-pri 1
pri 0 CRF 0-pri 0

Figure 8:
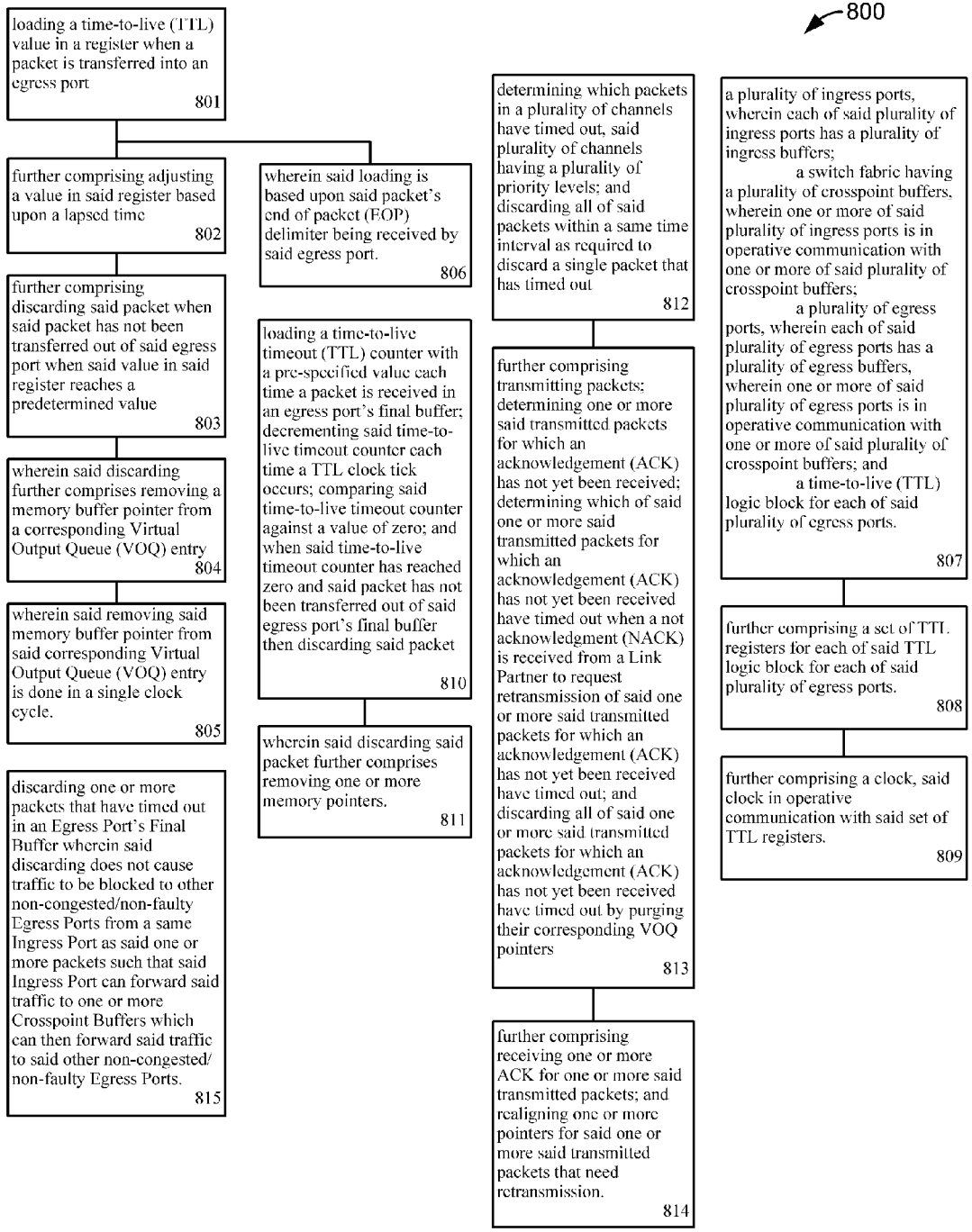
FIG. 8 illustrates various embodiments of the invention.

FIG. 8 illustrates, generally at 800, various embodiments of the invention. In one embodiment of the invention, at 801 is shown loading a time-to-live (TTL) value in a register when a packet is transferred into an egress port. In one embodiment of the invention, at 802 is shown further comprising adjusting a value in said register based upon a lapsed time. In one embodiment of the invention, at 803 is shown further comprising discarding said packet when said packet has not been transferred out of said egress port when said value in said register reaches a predetermined value. In one embodiment of the invention, at 804 is shown wherein said discarding further comprises removing a memory buffer pointer from a corresponding Virtual Output Queue (VOQ) entry. In one embodiment of the invention, at 805 is shown wherein said removing said memory buffer pointer from said corresponding Virtual Output Queue (VOQ) entry is done in a single clock cycle. In one embodiment of the invention, at 806 is shown wherein said loading is based upon said packet's end of packet (EOP) delimiter being received by said egress port. In one embodiment of the invention at 807 is shown a plurality of ingress ports, wherein each of said plurality of ingress ports has a plurality of ingress buffers; a switch fabric having a plurality of crosspoint buffers, wherein one or more of said plurality of ingress ports is in operative communication with one or more of said plurality of crosspoint buffers; a plurality of egress ports, wherein each of said plurality of egress ports has a plurality of egress buffers, wherein one or more of said plurality of egress ports is in operative communication with one or more of said plurality of crosspoint buffers; and a time-to-live (TTL) logic block for each of said plurality of egress ports, at 808 is shown further comprising a set of TTL registers for each of said TTL logic block for each of said plurality of egress ports, at 809 is shown further comprising a clock, said clock in operative communication with said set of TTL registers. In one embodiment of the invention, at 810 is shown loading a time-to-live timeout (TTL) counter with a pre-specified value each time a packet is received in an egress port's final buffer; decrementing said time-to-live timeout counter each time a TTL clock tick occurs; comparing said time-to-live timeout counter against a value of zero; and when said time-to-live timeout counter has reached zero and said packet has not been transferred out of said egress port's final buffer then discarding said packet. In one embodiment of the invention, at 811 is shown wherein said discarding said packet further comprises removing one or more memory pointers. In one embodiment of the invention, at 812 is shown determining which packets in a plurality of channels have timed out, said plurality of channels having a plurality of priority levels; and discarding all of said packets within a same time interval as required to discard a single packet that has timed out, at 813 is shown further comprising transmitting packets; determining one or more said transmitted packets for which an acknowledgement (ACK) has not yet been received; determining which of said one or more said transmitted packets for which an acknowledgement (ACK) has not yet been received have timed out when a not acknowledgment (NACK) is received from a Link Partner to request retransmission of said one or more said transmitted packets for which an acknowledgement (ACK) has not yet been received have timed out; and discarding all of said one or more said transmitted packets for which an acknowledgement (ACK) has not yet been received have timed out by purging their corresponding VOQ pointers. For example at 813, if transmit packet index has gone to 7 and NACK is returned from Link Partner with packet index 3; packet index 3~7's VOQ pointer will be purged if they all encountered TTL timeout. In one embodiment of the invention, at 814 is shown further comprising receiving one or more ACK for one or more said transmitted packets; and realigning one or more pointers for said one or more said transmitted packets that need retransmission. In one embodiment of the invention, at 815 is shown discarding one or more packets that have timed out in an Egress Port's Final Buffer wherein said discarding does not cause traffic to be blocked to other non-congested/non-faulty Egress Ports from a same Ingress Port as said one or more packets such that said Ingress Port can forward said traffic to one or more Crosspoint Buffers which can then forward said traffic to said other non-congested/non-faulty Egress Ports. For example, at 815 traffic is not blocked because packet(s) from an Ingress Port's Input Buffer through Crosspoint Buffer to a congested/faulty Egress Port's Final Buffer can be flushed out.

One of skill in the art will appreciate that variations of the invention are possible and within the teaching of the disclosure but not explicitly described. For example, a TTL clock tick has been described, however, the invention is not so limited and additional TTL clock ticks may be used. For example, a separate clock tick might be used for VC0 versus VC1/VC5. Additionally different size counters might be used as well.

Thus a method and apparatus for congestion and fault management with time-to-live have been described.

FIG. 1 illustrates a network environment 100 in which the techniques described may be applied. The network environment 100 has a network 102 that connects S servers 104-1 through 104-S, and C clients 108-1 through 108-C. More details are described below.

Figure 2:
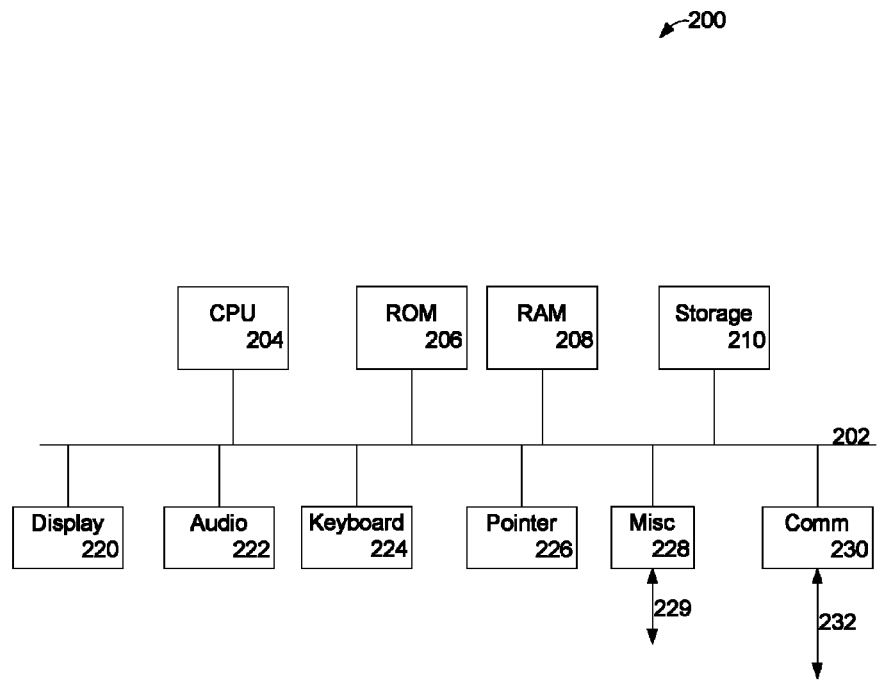
FIG. 2 is a block diagram of a computer system in which some embodiments of the invention may be used.

FIG. 2 is a block diagram of a computer system 200 in which some embodiments of the invention may be used and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be applied. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be applied to essentially any type of visual communicating means or device whether local or remote, such as a LAN, a WAN, a system bus, etc. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, an embodiment of the present invention. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

Various spellings may be used for terms used in the description. These variations are to be understood to relate to the same term unless denoted otherwise. For example: cut-through also spelled cut through; stomp is also spelled STOMP; etc.

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as ""substantially equal" is used to indicate that they are for all practical purposes equal.

It is to be understood that in any one or more embodiments of the invention where alternative approaches or techniques are discussed that any and all such combinations as my be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a method and apparatus for congestion and fault management with time-to-live have been described.

What is claimed is:

1. A method comprising setting a pre-determined time-to-live interval in each packet while said each packet is being written into an egress port's final buffer, and wherein a time-to-live timer for each of said each packet starts at end of packet for said each packet when received by said egress port's final buffer, and wherein said time-to-live interval is based upon a lapsed time, and wherein said each time-to-live timer uses a clock tick to determine when said each time-to-live timer has reached a time-to-live timeout and when said each time-to-live timeout has occurred then for each of said each packet said each packet is discarded through said egress port.

* * * * *